(12) United States Patent
Shiono

(10) Patent No.: US 6,767,041 B2
(45) Date of Patent: Jul. 27, 2004

(54) INSTRUMENT PANEL/PARTS ASSEMBLY

(75) Inventor: Masamitsu Shiono, Wako (JP)

(73) Assignee: Honda Giken Kogyo Kabushiki, Tokyo (JP)

( * ) Notice: Subject to any disclaimer, the term of this patent is extended or adjusted under 35 U.S.C. 154(b) by 0 days.

(21) Appl. No.: 10/432,675

(22) PCT Filed: May 10, 2002

(86) PCT No.: PCT/JP02/04569

§ 371 (c)(1),
(2), (4) Date: May 23, 2003

(87) PCT Pub. No.: WO02/100674

PCT Pub. Date: Dec. 19, 2002

(65) Prior Publication Data

US 2004/0026952 A1 Feb. 12, 2004

(30) Foreign Application Priority Data

Jun. 11, 2001 (JP) .......................................... 2001-175681

(51) Int. Cl.⁷ .............................................. B60K 37/00
(52) U.S. Cl. .............................. 296/70; 296/72; 180/90
(58) Field of Search ............................ 296/70, 193.02, 296/72, 208; 180/90

(56) References Cited

U.S. PATENT DOCUMENTS 4,560,602 A  12/1985  Draper

FOREIGN PATENT DOCUMENTS

DE  196 54 415 A1  6/1998
DE  199 55 221 A1  11/1999

OTHER PUBLICATIONS

Patent Abstracts of Japan, Publication No.: 11321287, Publication Date: Nov. 24, 1999, Air Conditioning Duct and Manufacturing Mounting Method of Air Conditioning Duct.

Primary Examiner—D. Glenn Dayoan
Assistant Examiner—Patricia Engle
(74) Attorney, Agent, or Firm—Rankin, Hill, Porter & Clark LLP

(57) ABSTRACT

An instrument panel/component parts assembly includes an instrument panel (11), a surface-mounted member, and a rear surface-mounted member. The surface-mounted member includes a shock absorbing pad (40) and an accommodation case (60). The rear surface-mounted member includes a plurality of air conditioning ducts (71, 72, 73). The instrument panel has a plurality of through-apertures for thereby coupling the surface-mounted member and the rear surface-mounted member to the instrument panel.

3 Claims, 13 Drawing Sheets

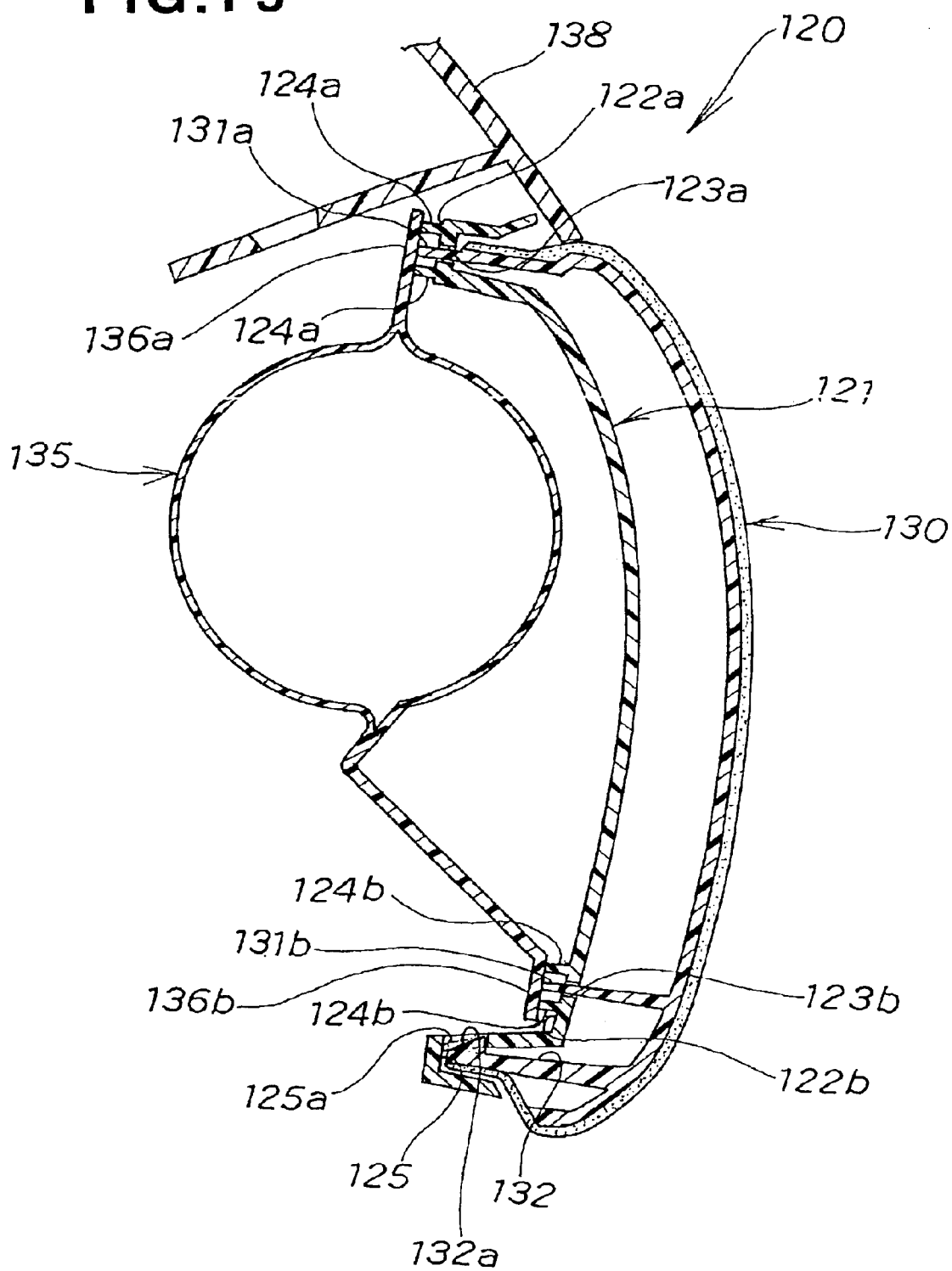

INSTRUMENT PANEL/PARTS ASSEMBLY

TECHNICAL FIELD

The present invention relates to a coupling structure for coupling a surface-mounted member and a rear surface-mounted member to front and rear surfaces of an instrument panel.

BACKGROUND ART

An instrument panel located at a front area of a vehicle compartment of a vehicle is known from, for example, Japanese Utility Model Publication No. 3-23891 which discloses "Mounting Structure for Safety Pad". With such mounting structure, the instrument panel is comprised of an instrument panel body and a safety pad. The instrument panel body is unitarily formed of resin material. The safety pad takes the form of a two-layer structure composed of a basic layer made of resin and a decorative layer made of urethane foam. The safety pad has a plurality of tongue-shaped engaging segments which are separately located along a longitudinal direction of an edge portion at a side to be mounted onto the instrument panel body. Each of these tongue-shaped engaging segments has a protrusion which engages the instrument panel body.

In order to assemble the safety pad to the instrument panel body, initially, each of the plurality of tongue-shaped engaging segments of the safety pad is inserted to each of the plurality of mounting apertures formed in the instrument panel body, and the protrusions of the respective tongue-shaped engaging segments which have been inserted are rendered to engage opening edges (protruding segments formed on the instrument panel) which form the respective apertures to perform temporary fixing. Subsequently, the respective tongue-shaped engaging segments are bent downward to completely engage the protruding segments of the instrument panel body to allow the safety pad to be mounted to the instrument panel body. Thus, merely inserting the tongue-shaped engaging segments to the mounting apertures and subsequently bending the tongue-shaped engaging segments allow the safety pad to simply be mounted to the instrument panel body.

An air conditioning duct is assembled to a rear surface of the instrument panel, i.e. a surface facing an engine room. An example in which the air conditioning duct is assembled to the instrument panel is disclosed in Japanese Patent Provisional Publication No. 11-321287 entitled "Air Conditioning Duct and Method of Manufacturing and Mounting Air Conditioning Duct". According to the method for mounting such air conditioning duct, legs of the air conditioning duct are brought into abutting contact with the rear surface of the instrument panel and, then, the legs are vibration welded to the rear surface of the instrument panel, thereby assembling the air conditioning duct to the instrument panel.

However, in the related art practice, a step of assembling the safety pad to the instrument panel body and a step of assembling the air conditioning duct to the rear surface of the instrument panel are carried out in separate stages, respectively, resulting in an increase in the number of operations in work with an increased effort needed for assembling operations of the safety pad and the air conditioning duct.

Further, there is a need for the front wall of the instrument panel body to be prepared with a pad mounting area for mounting the safety pad and, in addition, the rear surface of the instrument panel body is required to be prepared with a duct mounting area for mounting the air conditioning duct.

However, since the pad mounting area and the duct mounting area need to be prepared in relatively narrow spaces of the instrument panel body, it is hard to sufficiently ensure the respective mounting areas. As a result, the freedom of design when designing these members is limited, with a resultant increase in the time required for design.

Thus, the presence of the increased effort required in assembling work and the need for the design to be carried out in a relatively longer time period disturb a reduction in manufacturing cost.

DISCLOSURE OF THE INVENTION

It is therefore an object of the present invention to provide an instrument-panel/parts assembly which enables a reduction in an effort required in assembling operations while also enabling a reduction in a time period required for design.

According to an aspect of the present invention, there is provided an instrument panel and parts assembly, which comprises an instrument panel having a plurality of through-apertures, at least one surface-mounted member located on a front surface of the instrument panel, and at least one rear surface-mounted member located on a rear surface of the instrument panel, wherein the rear surface-mounted member has a plurality of coupling flaps projecting outwardly therefrom, and the instrument panel, the surface-mounted member and the coupling flaps of the rear surface-mounted member are coupled together by vibration welding via the through-apertures.

Forming the through-apertures in the instrument panel enables either one of the surface-mounted member and the rear surface-mounted member to be brought into abutting contact with the other member via the through-apertures. Coupling both members which have been held in abutting contact with one another enables the instrument panel to be caught between the surface-mounted member and the rear surface-mounted member to allow the surface-mounted member, the instrument panel and the rear surface-mounted member to be unitarily coupled with one another. Thus, since the surface-mounted member and the rear surface-mounted member can be simultaneously coupled with the instrument panel in a single operation step, it is possible to reduce an effort required for the assembling operations. Further, since the instrument panel is formed with the through-apertures, the instrument panel may have a simplified shape, resulting in an improvement in freedom of design of the instrument panel to shorten the time period required for the design.

The presence of the surface-mounted member and the rear surface-mounted member coupled to one another by vibration welding, for example, is preferable because mounting component parts such as rivets and screws can be dispensed with to reduce the number of component parts for thereby reducing the number of assembling steps when coupling the surface-mounted member and the rear surface-mounted member to one another to enable the surface-mounted member and th rear surface-mounted member to be simultaneously assembled to the instrument panel in a single step of op ration.

In a preferred form of the assembly, the surface-mounted member includes a plurality of temporary fixing claws and a plurality of coupling protrusions protruding from the surface-mounted member, with the surface-mounted member temporarily fixed to the instrument panel by compelling the temporary fixing claws to engage in the through-apertures while compelling the coupling protrusions to protrude through the instrument panel toward the rear surface thereof via the through-apertures to allow distal ends of the coupling protrusions to be coupled to the rear surface-mounted member, for example, by vibration welding. That is, the coupling protrusions of the surface mounted member pass through the through-apertures and are held in abutting engagement with the rear surface-mounted member, enabling the coupling protrusions to be coupled with the rear surface-mounted member. Further, compelling the temporary fixing claw of the surface-mounted member to engage in the associated through-aperture to be fixed thereto enables simple and temporary fixing of the surface-mounted member to the instrument panel. As a result, the coupling protrusion of the surface-mounted member can be easily coupled to the rear surface-mounted member without an increased effort.

Moreover, in the inventive assembly, the instrument panel may be provided on the rear surface with a plurality of convex segments and may be arranged such that, when coupling distal ends of the coupling protrusions and distal ends of the convex segments by vibration welding, the amount of protrusion of the coupling protrusions prior to welding is designed to be larger than the amount of protrusion of the convex segments prior to welding. That is, the presence of the protruding lengths of the coupling protrusions selected to be longer than those of the convex segments enables the distal ends of the coupling protrusions to be easily brought into abutting contact with the rear surface-mounted member, enabling simple coupling of the coupling protrusions with the rear surface-mounted member by vibration welding without an increased effort.

BRIEF DESCRIPTION OF THE DRAWINGS

Certain preferred embodiments of the present invention will be described in detail below, byway of example only, with reference to the accompanying drawings, in which:

FIG. 15 is a cross sectional view illustrating the relationship among an instrument panel, a shock absorbing pad and an air conditioning duct according to a second preferred embodiment of the present invention.

BEST MODE FOR CARRYING OUT THE INVENTION

Figure 1:
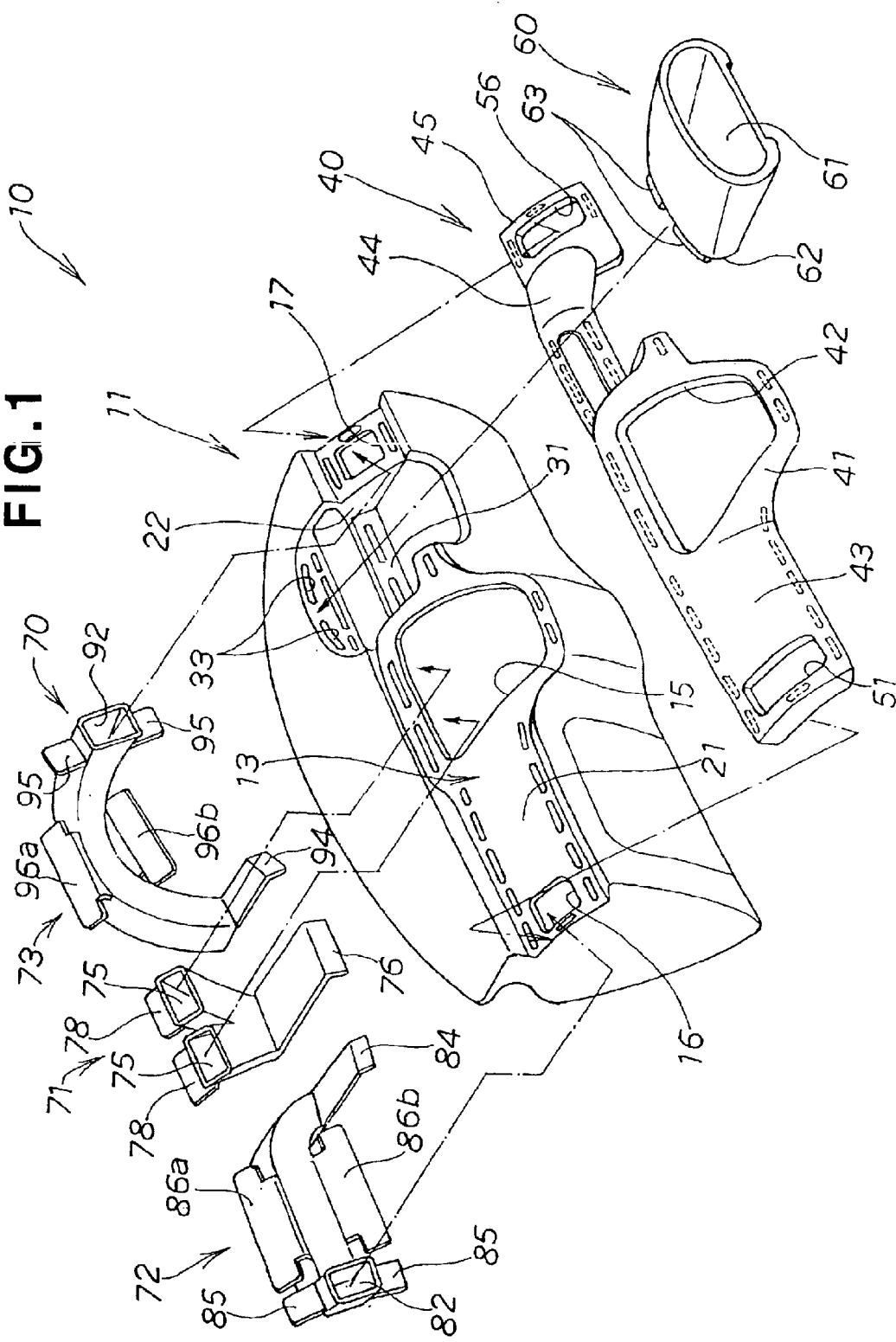
FIG. 1 is an exploded perspective view of an instrument panel, a shock absorbing pad and an accommodation case serving as a surface-mounted member, and an air conditioning duct serving as a rear surface-mounted member according to a first preferred embodiment of the present invention.

Several preferred embodiments of the present invention are described below in detail with reference to the attached drawings.

FIGS. 1 to 14 show a coupling structure for instrument panel mounting component parts according to a first preferred embodiment of the present invention.

Referring to FIGS. 1 to 5, the coupling structure 10 for the instrument panel mounting component parts is comprised of an instrument panel 11 adapted to be located in front of a passenger compartment of a vehicle, not shown, a shock absorbing pad 40 (a surface-mounted member) and an accommodation case (a surface-mounted member) 60 adapted to be assembled to a front surface (a surface facing the passenger compartment) of the instrument panel 11, and an air conditioning duct (a rear surface-mounted member) 70 adapted to be assembled to a rear surface (a surface facing an engine room) of the instrument panel 11.

The instrument panel 11, the shock absorbing pad 40, the accommodation case 60 and the air conditioning duct 70 are composed of component parts made of olefin type thermoplastic resin, respectively. Forming these component parts 11, 40, 60, 70 with the thermoplastic resin enables these component parts to be coupled to one another by vibration welding.

The accommodation case 60 serving as the surface-mounted member is a container body having an empty space 61 for accommodating a variety of meters, and a variety of warning lamps. The accommodation case 60 has a bottom portion formed with a pair of coupling protrusions 63, 63. When placing the accommodation case 60 in a case receiving section 44 of the shock absorbing pad 40, a bottom portion 62 is placed to be opposed to a bottom portion 31 of a case receiving section 22 of the instrument panel 11 to allow the coupling protrusions 63, 63 of the bottom portion 62 to be fitted to through-apertures 33, 33 formed in the bottom portion 31.

The air conditioning duct 70 serving as the rear surface-mounted member is comprised of a plurality of duct components involving a central air conditioning duct component 71, and left and right air conditioning duct components 72, 73.

Hereinafter, the instrument panel 11, the shock absorbing pad 40 and the air conditioning duct 70 are described.

Figure 2:
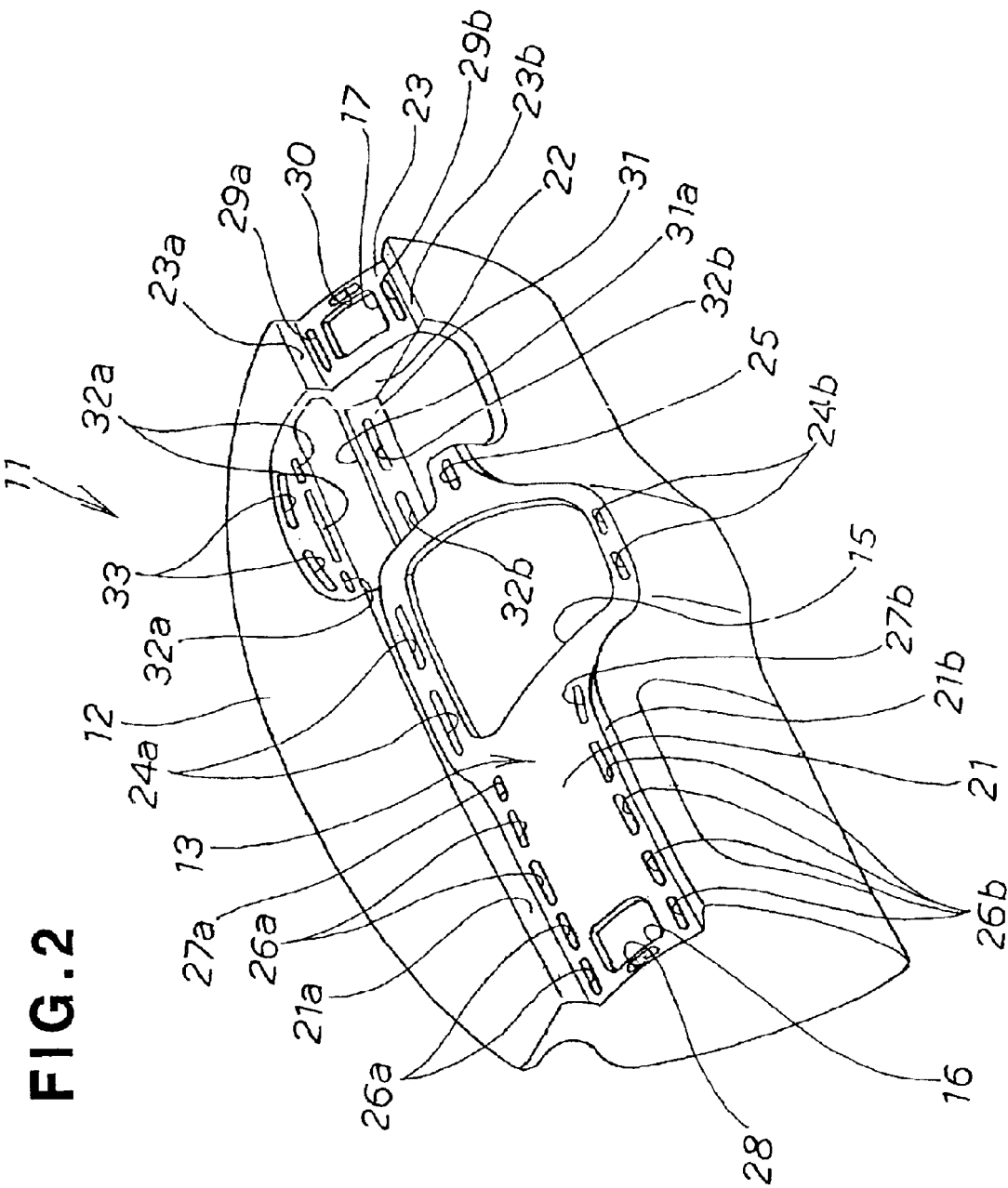
FIG. 2 is a perspective view of the instrument panel shown in FIG. 1.

The instrument panel 11 is shown in FIG. 2. The instrument panel 11 is formed in a dog-leg shape in cross section such that a front surface 12 has a ridgeline. A pad mounting section 13 is formed along the ridgeline of the surface 12. The pad mounting section 13 has a central area formed with a central opening 15, and left and right distal end portions formed with left and right openings 16, 17, respectively.

The pad mounting section 13 serves as a member to receive the shock absorbing pad 40 shown in FIG. 1. The pad mounting section 13 has a left concave receiving section 21 extending between the central opening 15 and a left distal end, with a right side of the central opening 15 being formed with the case receiving section 22 whose right side is formed with a right concave receiving section 23. The case receiving section 22 is further concaved deeper than the left concave receiving portion 21 in a forward direction The central opening 15 takes the form of an opening configured in a substantially reversed trapezoidal shape which permits the variety of meters and the variety of warning lamps to be assembled and which allows blow off ports of the central air conditioning duct 71 shown in FIG. 1 to be positioned. At an upper area of the central opening 15, a pair of upper through-apertures 24a, 24a are formed, and a lower area of the central opening 15 is formed with a pair of lower through-apertures 24b, 24b. A right side area of the central opening 15 is formed with a temporary fixing aperture 25.

Four through-apertures 26a are formed in an area between a left distal end and the center along an upper edge 21a of the left concave receiving section 21, and a single temporary fixing aperture 27a is formed in the vicinity of one of the upper through-apertures 26a closer to the center. Likewise, four through-apertures 26b are formed in an area between the left distal end and the center along a lower edge 21b of the left concave receiving section 21, and a single temporary fixing aperture 27b is formed in the vicinity of one of the lower through-apertures 26b closer to the center. A temporary fixing aperture 28 is formed at a left edge portion of a left opening 16.

The bottom portion 31 of the case receiving section 22 is formed with a bottom opening 31a. A plurality of upper through-apertures 32a are formed in an upper area of the bottom opening 31a. Two through-apertures 32b are formed in a lower area of the bottom opening 31a.

A pair of through-apertures 33, 33 are formed at an upper area of the plural upper through-apertures 32a in the bottom portion 31 of the case receiving section 22 for permitting the accommodation case 60 shown in FIG. 1 to be assembled.

An upper through-aperture 29a is formed in an area at a side of an upper edge 23a of the right concave receiving section 23. A lower through-aperture 29b is formed in an area at a side of a lower edge 23b of the right concave receiving section 23. A temporary fixing aperture 30 is formed in a right edge portion of a right opening 17.

Figure 3:
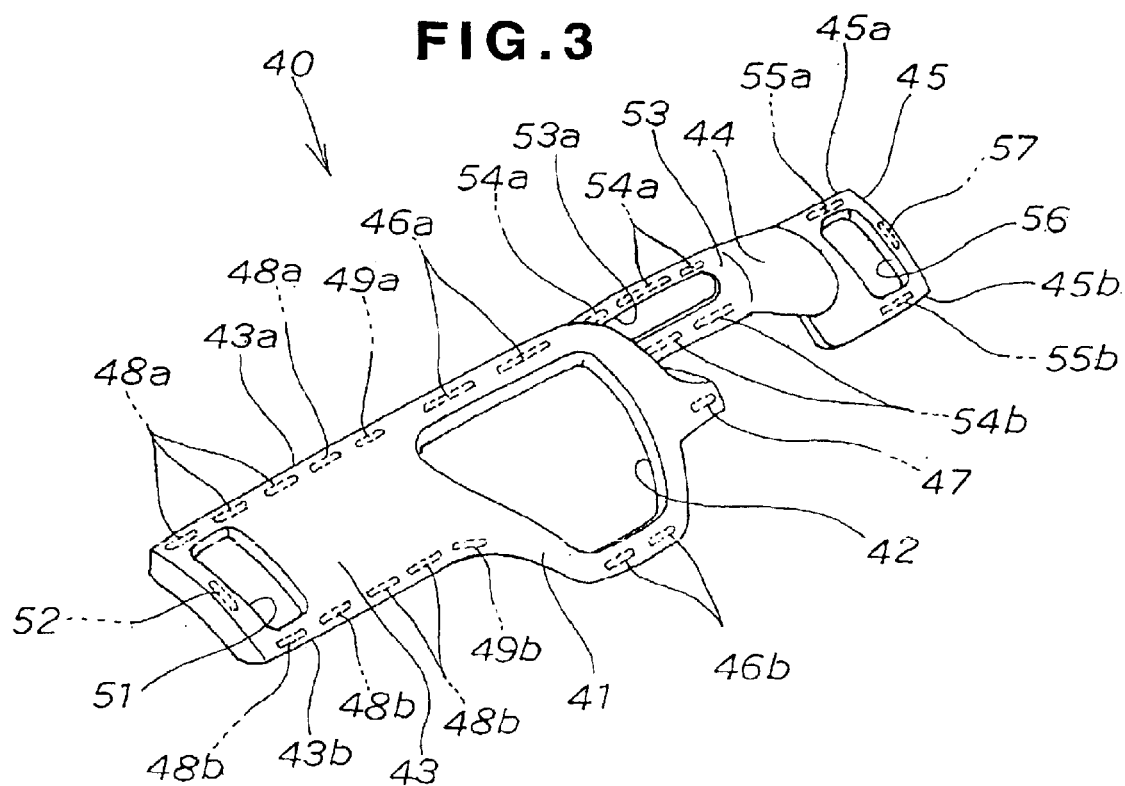
FIG. 3 is a perspective view of the shock absorbing pad shown in FIG. 1.

FIG. 3 shows the shock absorbing pad 40 which serves as the surface-mounted member shown in FIG. 1.

The shock absorbing pad 40 forms a component part which is assembled to the pad mounting section 13 of the instrument panel 11 shown in FIG. 1. The shock absorbing pad 40 is comprised of a central pad section 41 formed with a relatively large pad central opening 42, a left pad section 43 extending between the central pad section 41 and a left distal end, a case receiving section 44 for receiving the accommodation case 60 shown in FIG. 1 at a right side of the central pad section 41, and a right pad section 45 located at a right side of the case receiving section 44.

The pad central opening 42 is formed in a substantially reversed trapezoidal shape which conforms to the central opening 15 of the instrument panel 11 and serves as an opening to accommodate the instruments while permitting the blow out ports of the central air conditioning duct 71 to be exposed thereto. The central pad section 41 has a pair of upper coupling protrusions 46a, 46a formed at an upper area of the pad central opening 42, and a pair of lower coupling protrusions 46b, 46b formed at a lower area of the central opening 15. Further, the central pad section 41 has a temporary fixing claw 47 formed at a right side of the pad central opening 42.

Four upper coupling protrusions 48a are formed in an area between a left distal end and the center along an upper edge 43a of the left pad section 43. A single upper temporary fixing claw 49a is formed at a position in close proximity to the upper coupling protrusion 48a closer to the center. Four lower coupling protrusions 48b are formed in an area between the left distal end and the center along a lower edge 43b of the left pad section 43. A single lower temporary fixing claw 49b is formed at a position in close proximity to the lower coupling protrusion 48b closer to the center. The left pad section 43 has a right end portion formed with a lengthwise left pad opening 51, with a left edge portion of the left pad opening 51 being formed with a temporary fixing claw 52.

The case receiving section 44 has a bottom opening 53a formed at a bottom portion 53, a plurality of upper coupling protrusions 54a formed at an upper area of the bottom opening 53a, and a pair of lower coupling protrusions 54b, 54b formed at a lower area of the bottom opening 53a.

The right pad section 45 has an upper coupling protrusion 55a formed at an upper edge 45a, a lower coupling protrusion 55b formed at a lower edge 45b of the right pad section 45, a lengthwise right opening 56 formed between the upper and lower coupling protrusions 55a, 55b, and a temporary fixing claw 57 formed at a right edge portion of the right opening 56.

The upper and lower coupling protrusions 46a, 46b, 48a, 48b, 54a, 54b and the coupling protrusions 63 shown in FIG. 1 are described below in detail with reference to FIGS. 7A to 9B. Other coupling protrusions are similar in structure to these coupling protrusions and therefore a detailed description of the same is herein omitted.

Further, the temporary fixing claws 49b, 52 are described below in detail with reference to FIGS. 10A to 11B. Other temporary fixing claws are similar in structure to these temporary fixing claws and therefore a detailed description of the same is herein omitted.

Figure 4:
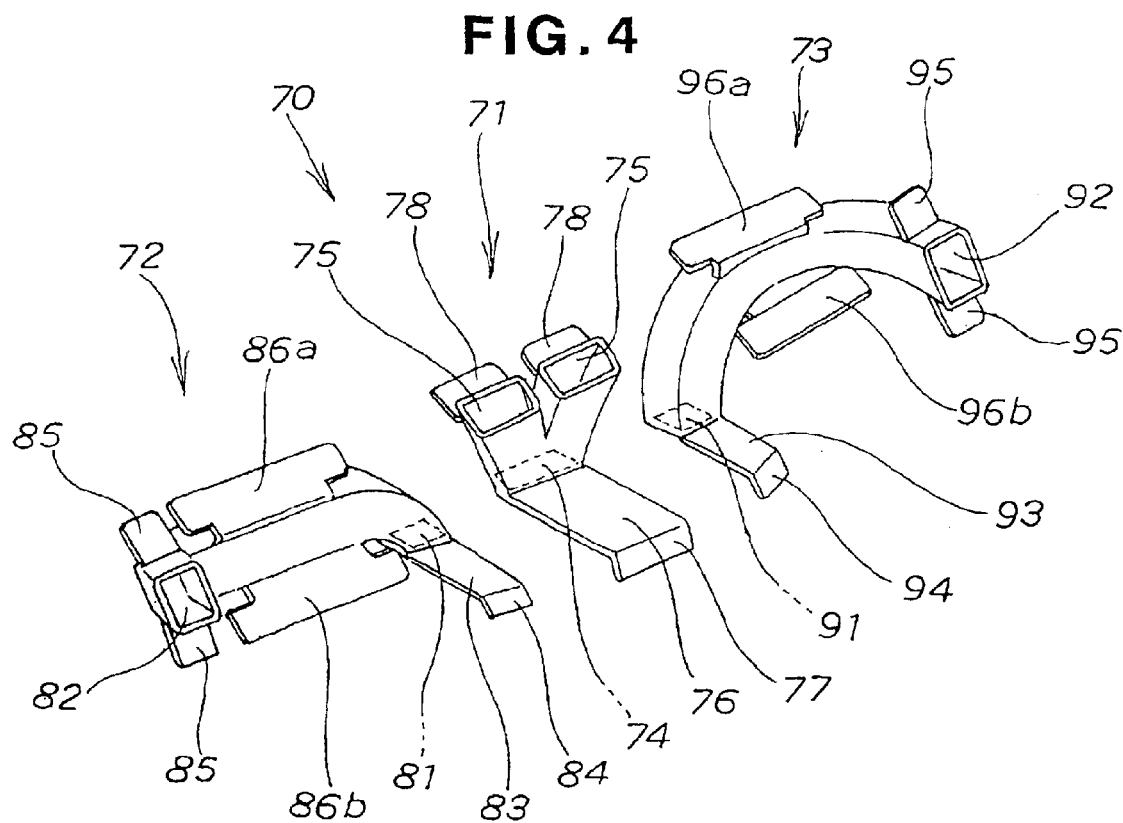
FIG. 4 is a perspective view of the air conditioning duct shown in FIG. 1.

FIG. 4 shows the air conditioning duct 70. The air conditioning duct 70, serving as the rear surface-mounted member, includes the central air conditioning duct component 71, and the left and right air conditioning duct components 72, 73.

The central air conditioning duct component 71 takes the form of a bifurcated duct which has a lower end formed with a supply port 74 and an upper end formed with a pair of blow out ports 75, 75. The central air conditioning duct component 71 includes a horizontal stay 76 extending from the supply port 74 toward the instrument panel 11 shown in FIG. 1, a lower coupling flap 77 formed at a distal end of the horizontal stay 76, and upper coupling flaps 78, 78 formed at respective sides of the pair of blow out ports 75, 75.

The left air conditioning duct component 72 takes the form of a duct which has an inward and lower end formed with a supply port 81 and an outward and upper end formed with a blow out port 82. The left air conditioning duct component 72 includes a horizontal stay 83 extending from the supply port 81 toward the instrument panel 11 shown in FIG. 11, a lower coupling flap 84 formed at a distal end of the horizontal stay 83, a pair of upper coupling flaps 85, 85 formed at sides of the blow out port 82, and upper and lower coupling flaps 86a, 86b formed at a center of the duct component.

The right air conditioning duct component 73 takes the form of a duct which has an inward and lower end formed with a supply port 91 and an outward and upper end formed with a blow out port 92. The left air conditioning duct component 73 includes a horizontal stay 93 extending from the supply port 91 toward the instrument panel 11 shown in FIG. 1, a lower coupling flap 94 formed at a distal end of the horizontal stay 93, a pair of upper coupling flaps 95, 95 formed at sides of the blow out port 92, and upper and lower coupling flaps 96a, 96b formed at a center of the duct component.

Figure 5:
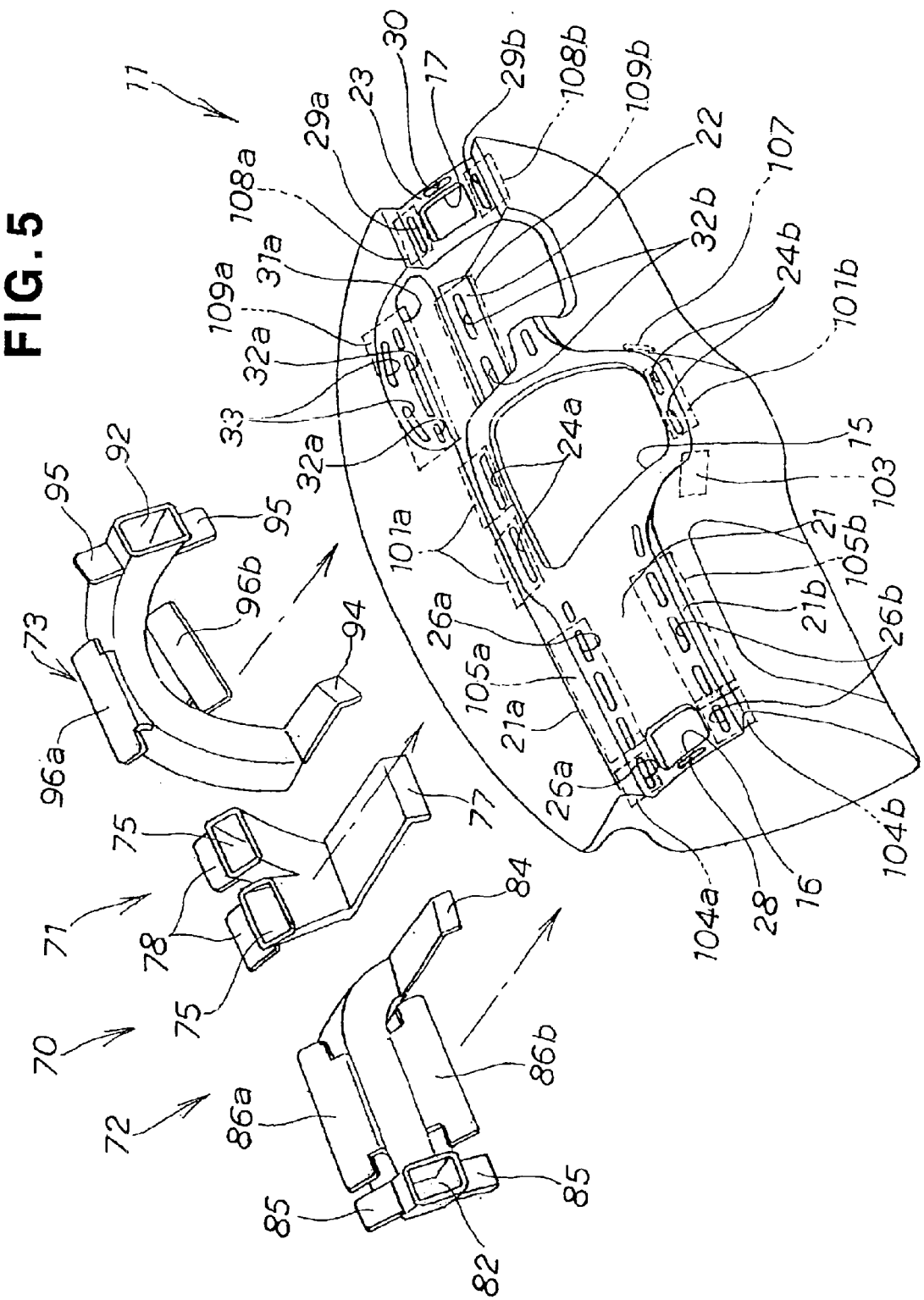
FIG. 5 is a perspective view illustrating a position for mounting the air conditioning duct, shown in FIG. 1, to the instrument panel.

FIG. 5 is an illustrative view showing how the air conditioning duct 70 in the form of the rear surface-mounted member is mounted to the rear surface of the instrument panel 11.

The upper coupling flaps 78, 78 of the central air conditioning duct component 71 take the forms of abutting engagement segments enabled to be brought into abutting engagement with a pair of upper central rest areas 101a, 101a, respectively, which are located in an upper area of the central opening 15 at the rear side of the instrument panel 11. The upper central rest areas 101a, 101a include the respective upper through-apertures 24a, 24a. The lower coupling flap 77 of the central air conditioning duct component 71 takes the form of an abutting engagement segment enabled to be brought into abutting engagement with a lower central rest area 101b which is located in a downward area of the central opening 15 at the rear side of the instrument panel 11. The lower central rest area 101b has the pair of lower through-apertures 24b.

Allowing the upper coupling flaps 78, 78 of the central air conditioning duct component 71 to be brought into abutting engagement with the associated upper central rest areas 101a, 101a while permitting the lower coupling flap 77 to be brought into abutting engagement with the lower central rest area 101b cause the pair of blow out ports 75, 75 to be positioned in the central opening 15 of the instrument panel 11.

The lower coupling flap 84 of the left air conditioning duct component 72 takes the form of an abutting engagement segment enabled to be brought into abutting engagement with an inside rest area 103 which is located at the rear side of the instrument panel 11 and at a left side of the lower central rest area 101b. The pair of upper coupling flaps 85 of the left air conditioning duct component 72 take the forms of abutting engagement segments enabled to be brought into abutting engagement with outward, upper and lower rest areas 104a, 104b which are located at upper and lower positions of the left opening 16 at the rear side of the instrument panel 11. The outward, upper and lower rest areas 104a, 104b include the outermost, upper and lower through-apertures 26a, 26b, respectively. The upper and lower central coupling flaps 86a, 86b of the left air conditioning duct components 72 take the forms of abutting engagement segments enabled to be brought into abutting engagement with upper and lower rest areas 105a, 105b formed along the upper and lower edges 21a, 21b of the left concave receiving section 21 at the rear side of the instrument panel 11. The upper and lower rest areas 105a, 105b include the upper and lower through-apertures 26a, 26b, respectively, in rows each in three pieces.

Allowing the lower coupling flap 84 of the left air conditioning duct component 72 to be brought into abutting engagement with the associated inside rest area 103 while permitting the pair of coupling flaps 85 to be brought into abutting engagement with the outside upper and lower rest areas 104a, 104b and also permitting the pair of central coupling flaps 86a, 86b to be brought into abutting engagement with the upper and lower rest areas 105a, 105a cause the blowout port 82 of the left air conditioning duct component 72 to be positioned in the left opening 16 of the instrument panel 11.

The lower coupling flap 94 of the right air conditioning duct component 73 takes the form of an abutting engagement segment enabled to be brought into abutting engagement with an inside rest area 107 which is located at the rear side of the instrument panel 11 and at a right side of the lower central rest area 101b.

The pair of upper coupling flaps 95, 95 of the right air conditioning duct component 73 take the forms of abutting engagement segments enabled to be brought into abutting engagement with outward, upper and lower rest areas 108a, 108b which are located at the rear side of the instrument panel 11 and at upper and lower positions of the right opening 17. The outward, upper and lower rest areas 108a, 108b contain regions involving the outermost, upper and lower through-apertures 29a, 29b, respectively.

The upper and lower central coupling flaps 96a, 96b of the right air conditioning duct component 73 take the forms of abutting engagement segments enabled to be brought into abutting engagement with upper and lower rest areas 109a, 109b which are located at the rear side of the instrument panel 11 and at upper and lower positions of the bottom opening 31a of the receiving section 22. The upper rest area 109a includes a region which is formed with the plurality of upper through-apertures 32a, and the through-apertures 33, 33. The lower rest area 109b includes a region which is formed with the plurality of lower through-apertures 32b.

Allowing the lower coupling flap 94 of the right air conditioning duct component 73 to be brought into abutting engagement with the associated inside rest area 107 while permitting the pair of upper coupling flaps 95, 95 to be brought into abutting engagement with the outside, upper and lower rest areas 108a, 108b and also permitting the pair of central coupling flaps 96a, 96b to be brought into abutting engagement with the upper and lower rest areas 109a, 109b cause the blow out port 92 of the right air conditioning duct component 73 to be positioned in the right opening 17 of the instrument panel 11.

Figure 6:
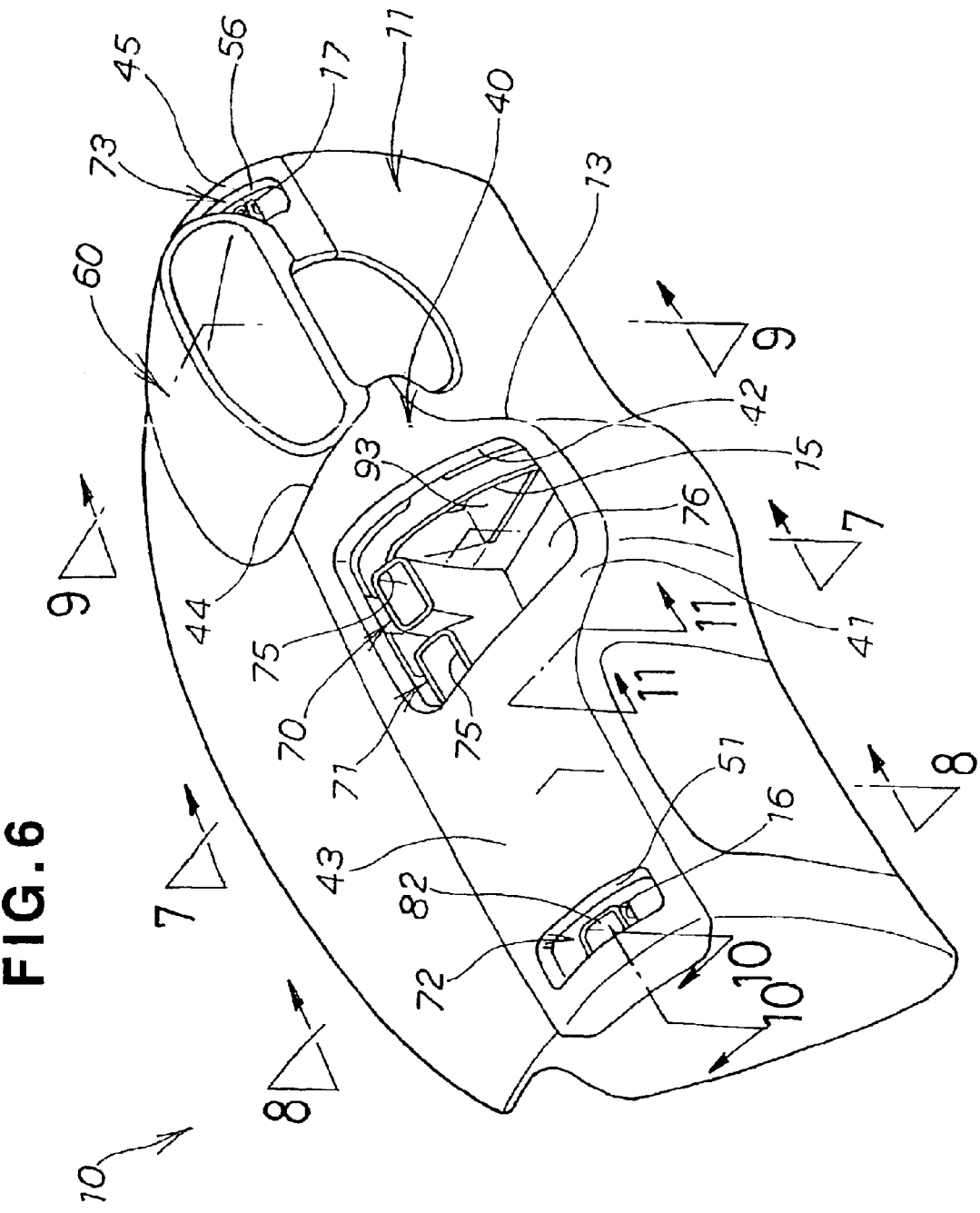
FIG. 6 is a perspective view of a condition wherein the instrument panel, the shock absorbing pad, the accommodation case and the air conditioning duct, shown in FIG. 1, are assembled.

FIG. 6 shows a condition wherein the shock absorbing pad 40, the accommodation case 60 and the air conditioning duct 70 are assembled to the instrument panel 11. The shock absorbing pad 40 is mounted to the pad mounting section 13 of the instrument panel 11. The accommodation case 60 is mounted to the case receiving section 44 of the shock absorbing pad 40. The central air conditioning duct component 71 and the left and right air conditioning duct components 72, 73 are amounted to the rear surface of the instrument panel 11.

The pair of blowout ports 75, 75 of the central air conditioning duct component 71 face the pad central opening 42 of the shock absorbing pad 40 via the central opening 15 of the instrument panel 11. The blow out port 82 of the left air conditioning duct component 72 faces the left opening 51 of the shock absorbing pad 40 via the left opening 16 of the instrument panel 11. The blow out port 92 (see FIG. 1) of the right air conditioning duct component 73 faces the left opening 56 of the shock absorbing pad 40 via the right opening 17 of the instrument panel 11.

Figure 7A:
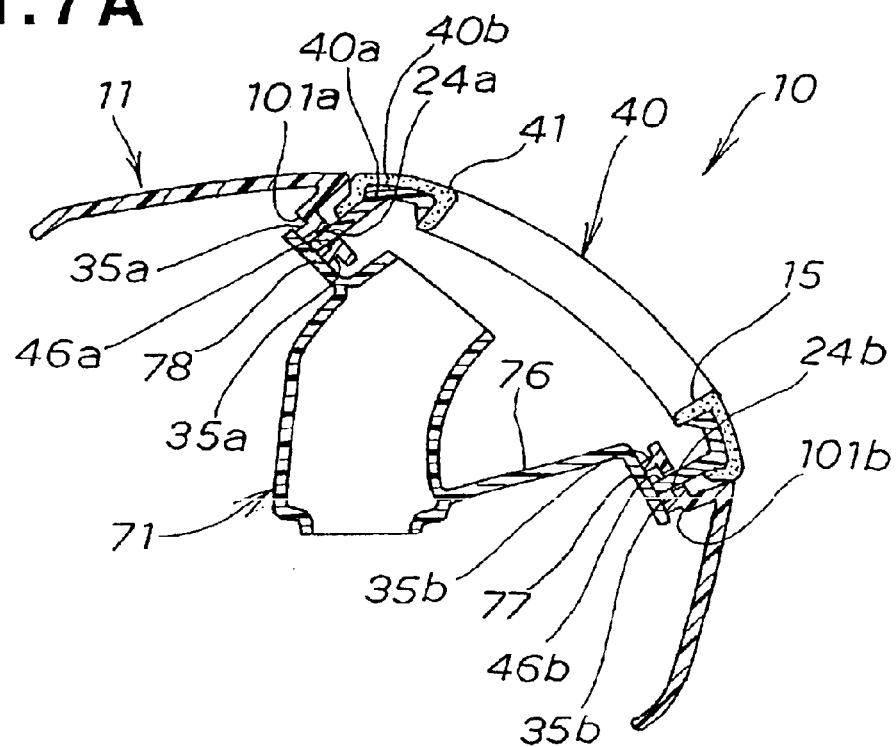
FIGS. 7A and 7B are cross sectional views taken along line 7—7 of FIG. 6.
Figure 7B:
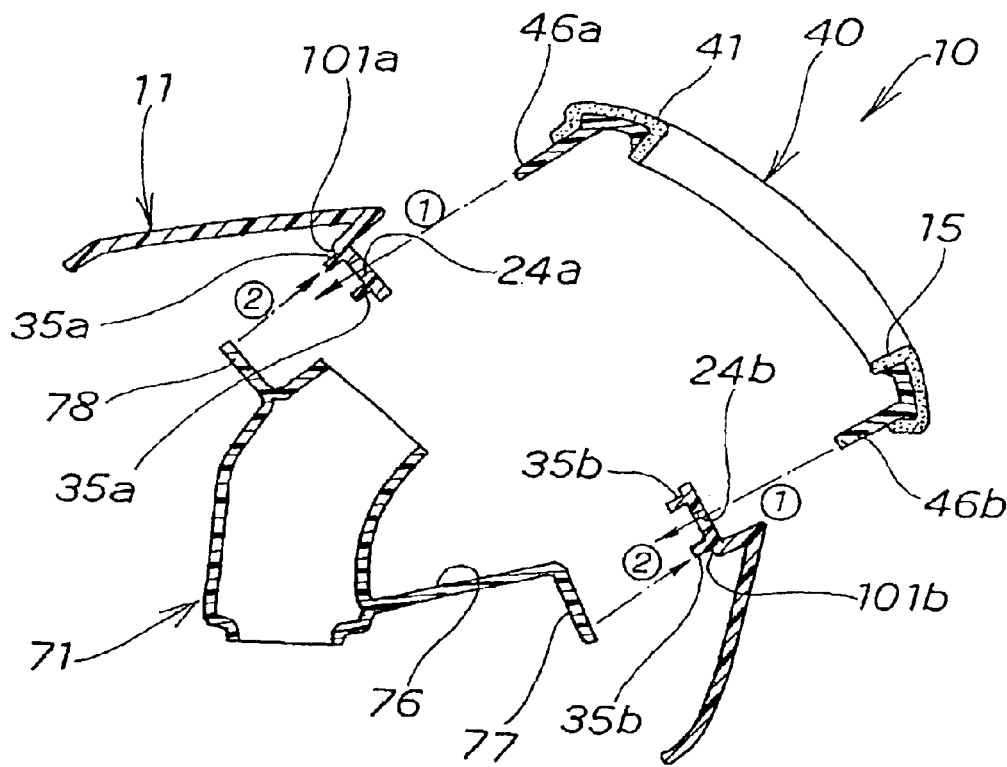

FIGS. 7A and 7B show the instrument panel 11 and the shock absorbing pad 40 in an assembled condition.

As shown in FIG. 7A, the upper central rest area 101a of the rear surface of the instrument panel 11 is formed with upper convex segments 35a, 35a at upper and lower positions of the upper through-aperture 24a, respectively, in the vicinity thereof. Likewise, the lower central rest area 101b of the rear surface of the instrument panel 11 is formed with lower convex segments 35b, 35b at upper and lower positions of the lower through-aperture 24b, respectively, in the vicinity thereof.

The shock absorbing pad 40 takes the form of a structure wherein, during formation of a pad body 40a, the shock absorbing member 40b made of urethane form is unitarily formed with a surface of the pad body 40a. The pad body 40a is made of olefin thermoplastic resin.

In FIG. 7B, the upper and lower coupling protrusions 46a, 46b of the shock absorbing pad 40 are inserted to the upper and lower through-apertures 24a, 24b formed at the center of the instrument panel 11, respectively, as shown by an arrow ①. Then, the upper and lower coupling flaps 78, 77 of the central air conditioning duct component 71 are brought into abutting engagement with respective distal ends of the upper and lower coupling protrusions 46a, 46b and the upper and lower convex segments 35a, 35b as shown by an arrow ②. Under such a condition, welding is conducted by vibrating abutted portions to cause a central pad portion 41 of the shock absorbing pad 40 and the central air conditioning duct component 71 to be mounted to the center of the instrument panel 11 as shown in FIG. 7A.

Figure 8A:
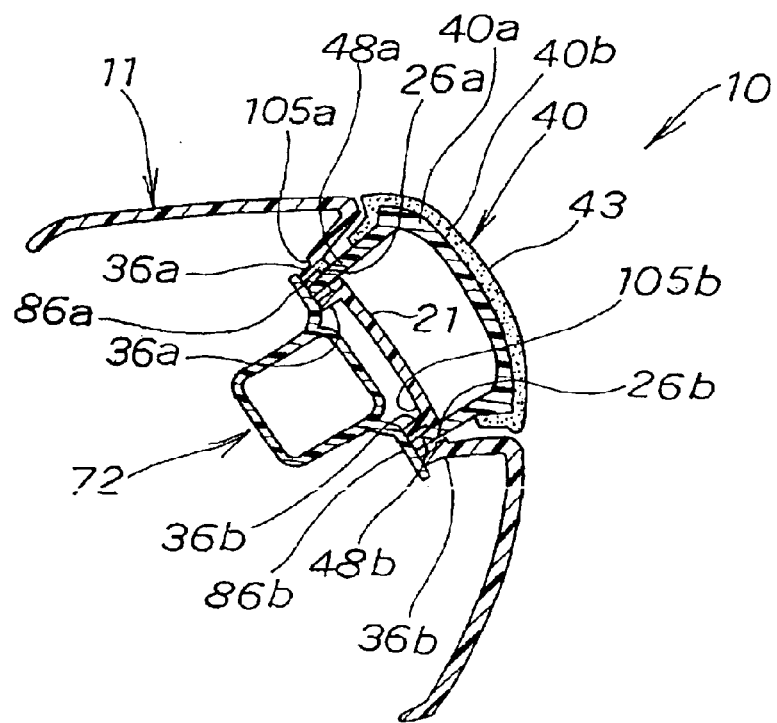
FIGS. 8A and 8B are cross sectional views taken along line 8—8 of FIG. 6.

As shown in FIG. 8A, the upper rest area 105a of the rear surface of the left concave receiving section 21 of the instrument panel 11 is formed with upper convex segments 36a, 36a at upper and lower positions of the upper through-apertures 26a, respectively, in the vicinity thereof. The lower rest area 105b of the rear surface of the left concave receiving section 21 of the instrument panel 11 is formed with lower convex segments 36b, 36b at upper and lower positions of the lower through-apertures 26b, respectively, in the vicinity thereof.

Figure 8B:
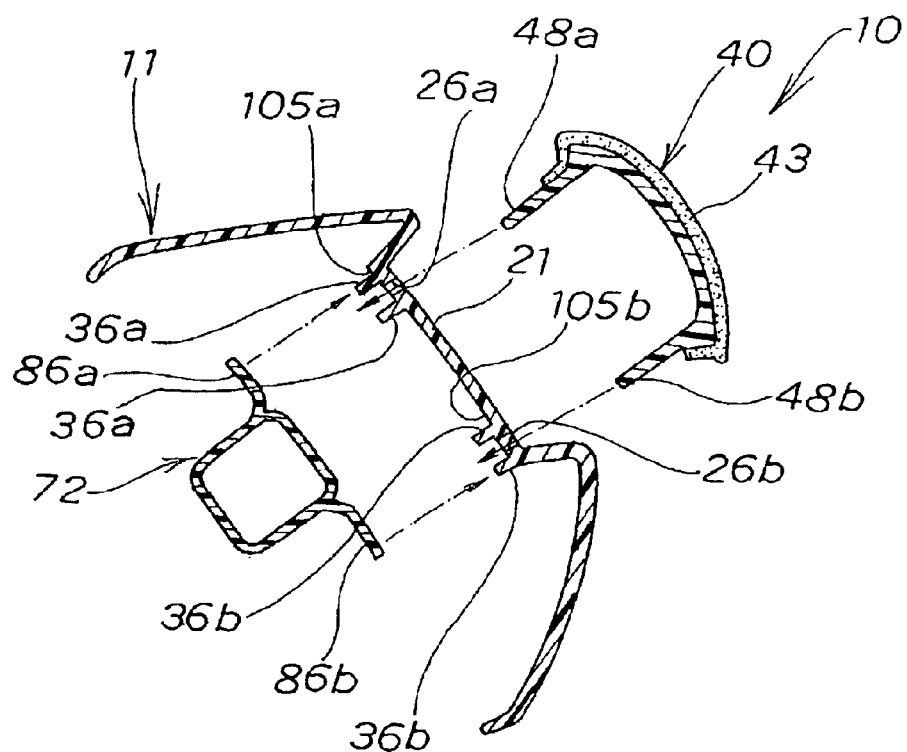

In FIG. 8B, the upper and lower coupling protrusions 48a, 48b of the shock absorbing pad 40 are inserted to the upper and lower through-apertures 26a, 26b of the instrument panel 11, respectively, as shown by an arrow. Then, the upper and lower central coupling flaps 86a, 86b of the left air conditioning duct component 72 are brought into abutting engagement with respective distal ends of the upper and lower coupling protrusions 48a, 48b of the shock absorbing pad 40 and the distal ends of the upper and lower convex segments 36a, 36b as shown by an arrow. Under such a condition, welding is conducted by vibrating abutted portions to cause a left pad section 43 of the shock absorbing pad 40 and the left air conditioning duct component 72 to be mounted to the left concave receiving section 21 of the instrument panel 11 as shown in FIG. 8A.

Figure 9A:
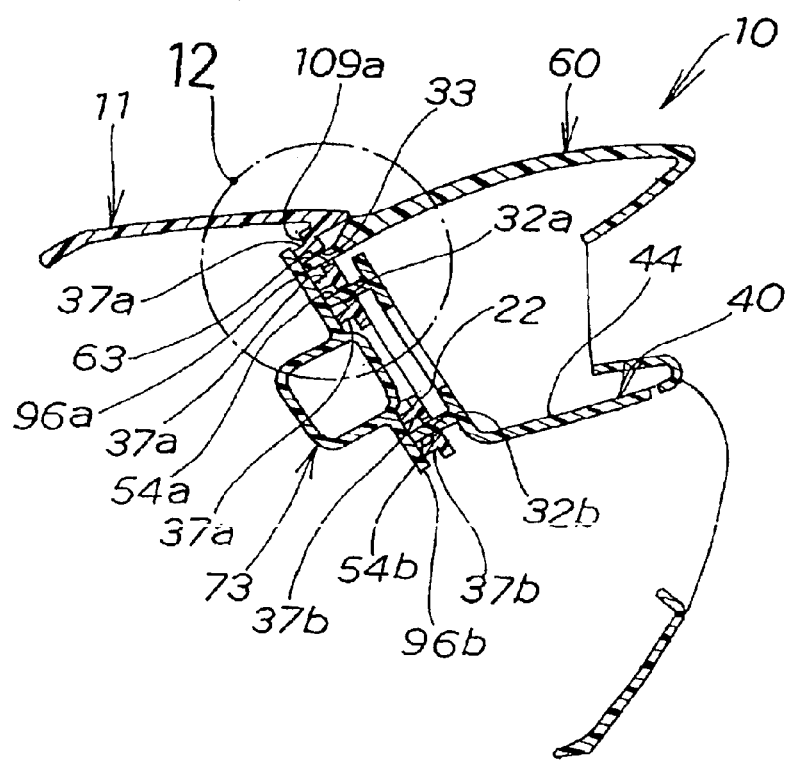
FIGS. 9A and 9B are cross sectional views taken along line 9—9 of FIG. 6.

As shown in FIG. 9A, the upper rest area 109a of the rear surface of the concave receiving section 22 of the instrument panel 11 is formed with three rows of upper convex segments 37a in the vicinities of the upper through-apertures 32a and the through-apertures 33. The lower rest area 109b of the rear surface of the concave receiving section 22 of the instrument panel 11 is formed with lower convex segments 37b, 37b at upper and lower positions of the lower through-apertures 32b, respectively, in the vicinity thereof.

Figure 9B:
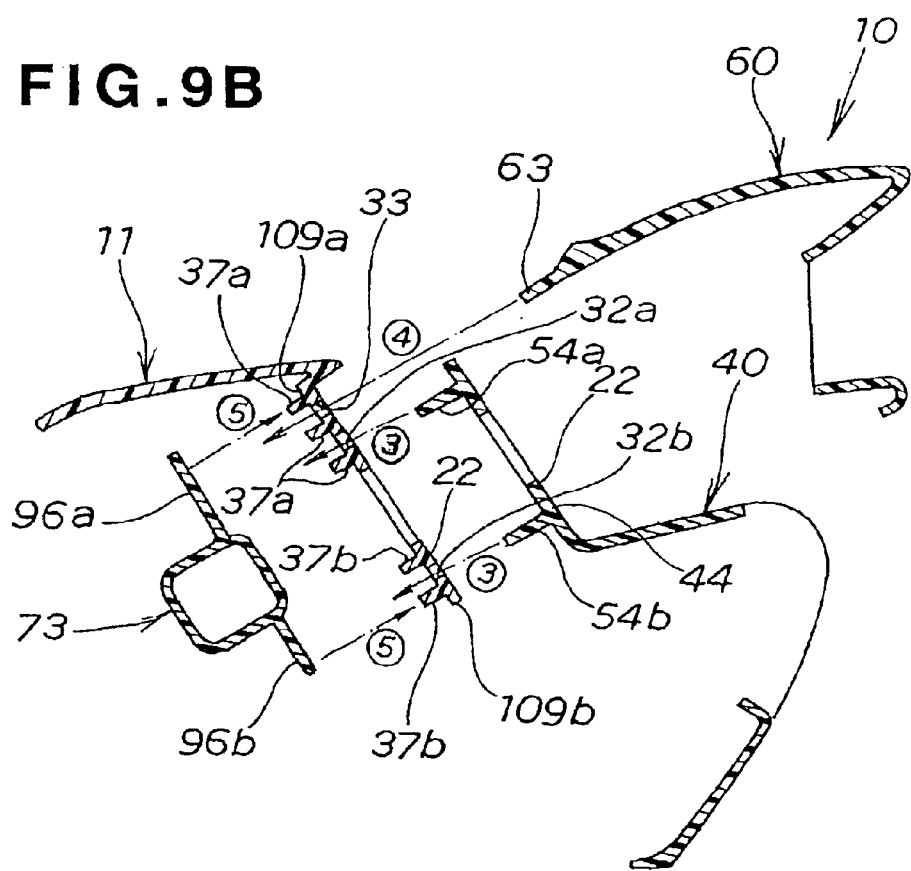

In FIG. 9B, the upper and lower coupling protrusions 54a, 54b of the shock absorbing pad 40 are inserted to the upper and lower through-apertures 32a, 32b of the instrument panel 11, respectively, as shown by an arrow ③. Then, the coupling protrusions 63 of the accommodation case 60 are inserted to the through-apertures 33 of the instrument panel 11 as shown by an arrow ④. Subsequently, the upper and lower central coupling flaps 96a, 96b of the right air conditioning duct component 73 are brought into abutting engagement with respective distal ends of the upper and lower coupling protrusions 54a, 54b, the coupling protrusions 63 and the upper and lower convex segments 37a, 37b as shown by an arrow ⑤. Under such a condition, welding is conducted by vibrating abutted portions to cause the case receiving section 44 of the shock absorbing pad 40, the accommodation case 60 and the right air conditioning duct component 73 to be mounted to the receiving section 22 of the instrument panel 11 as shown in 9A.

As set forth above with reference to FIGS. 7A to 9B, the instrument panel 11 is formed with the plurality of through-apertures 24a, 24b, 26a, 26b, 29a, 29b (see FIG. 5), 32a, 32b, 33, with the shock absorbing pad 40 and the air conditioning duct 70 being coupled to the front and rear surfaces of the instrument panel 11 via the through-apertures 24a, 24b, 26a, 26b, 29a, 29b, 32a, 32b, 33.

Thus, coupling both the abutted members 40, 70 causes the instrument panel 11 to be caught between the shock absorbing pad 40 and the air conditioning duct 70 such that the shock absorbing pad 40, the air conditioning duct 70 and the instrument panel 11 are unitarily mounted. Accordingly, the shock absorbing pad 40 and the air conditioning duct 70 can be simultaneously mounted to the instrument panel 11 in a single step, with a resultant reduction in back breaking effort required for assembling operation.

Further, the presence of the instrument panel 11 merely formed with the through-apertures 24a, 24b, 26a, 26b, 29a, 29b, 32a, 32b, 33 enables the shock absorbing pad 40 and the air conditioning duct 70 to be assembled with respect to one another, resulting in a simplified structure in shape of the instrument panel 11. Thus, the presence of the simplified shape of the instrument panel 11 allows the freedom in design of the same to be improved for thereby providing a capability of shortening the time required for design.

Figure 10A:
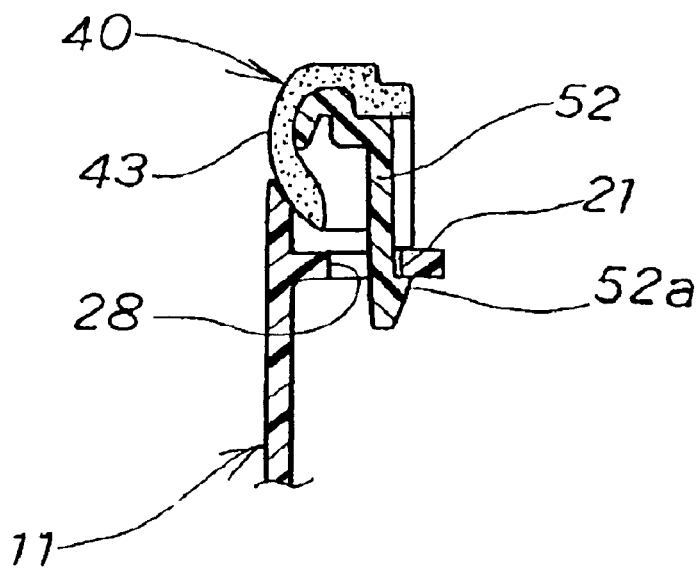
FIGS. 10A and 10B are cross sectional views taken along line 10—10 of FIG. 6.
Figure 10B:
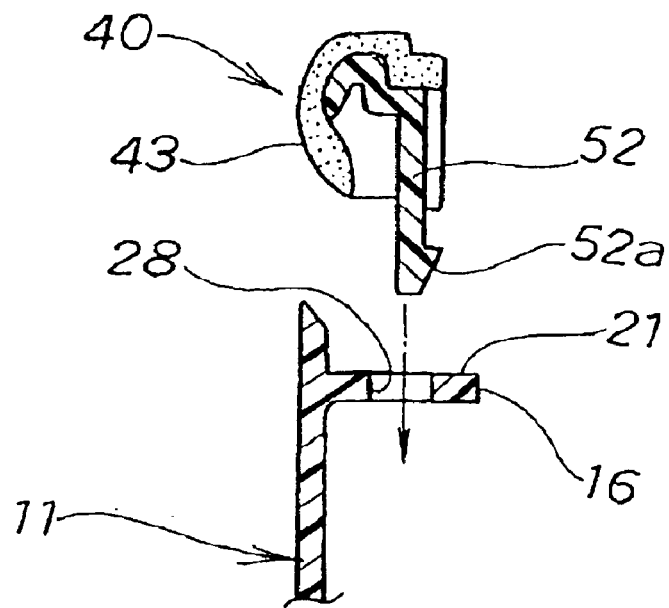

FIGS. 10A and 10B show detailed examples wherein the shock absorbing pad 40 is temporarily fixed to the instrument panel 11.

As shown in FIG. 10A, the left pad portion 43 of the shock absorbing pad 40 is formed at its left end with the temporary fixing claw 52. The temporary fixing claw 52 has a distal end formed with an engaging segment 52a. The engaging segment 52a extends in a tapered shape.

In FIG. 10B, the temporary fixing claw 52 of the shock absorbing pad 40 is inserted to the temporary fixing aperture 28 of the instrument panel 11 as shown by an arrow. During such operation, although the engaging segment 52a of the temporary fixing claw 52 engages a peripheral edge forming the temporary fixing aperture 28, the temporary fixing claw 52 is resiliently deformed toward a center of the temporary fixing aperture 28 in a warped shape, permitting the engaging segment 52a to pass through the temporary fixing aperture 28. Upon pass of the engaging segment 52a through the temporary fixing aperture 28, the temporary fixing claw 52 restores to its original position prior to the resilient deformation, allowing the engaging segment 52a to engage the peripheral edge of the temporary fixing aperture 28 as shown in FIG. 10A. This enables the left end of the safety pad 40 to be temporally fixed to the left end of the instrument panel 11.

The temporary fixing claw 57 formed at the right distal end of the shock absorbing pad 40 shown in FIG. 3 has the same structure as the temporary fixing claw 52 described above and therefore a description of the temporary fixing claw 57 is herein omitted.

Figure 11A:
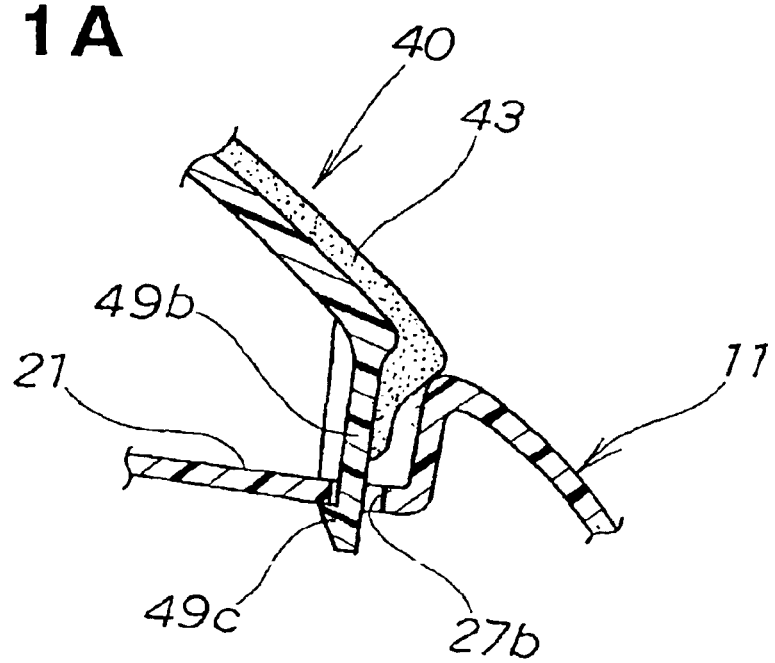
FIGS. 11A and 11B are cross sectional views taken along line 11—11 of FIG. 6.
Figure 11B:
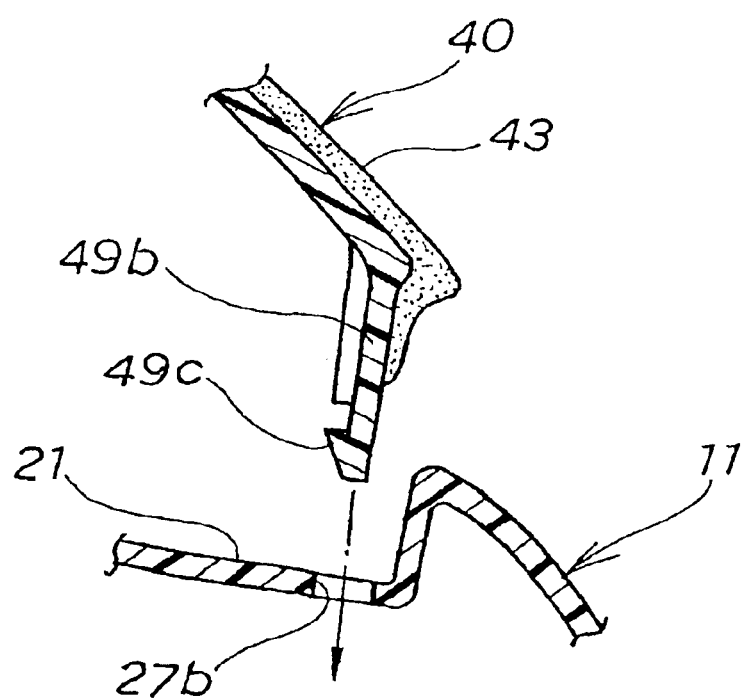

FIGS. 11A and 11B show detailed examples wherein the left pad section 43 of the shock absorbing pad 40 is temporarily fixed to the instrument panel 11.

As shown in FIG. 11A, the left pad section 43 of the shock absorbing pad 40 has the downwardly extending temporary fixing claw 49b. The downwardly extending temporary fixing claw 49b has a distal end formed with an engaging segment 49c. The engaging segment 49c extends in a tapered shape.

In FIG. 11B, the temporary fixing claw 49b of the shock absorbing pad 40 is inserted to the lower temporary fixing aperture 27b of the instrument panel 11. During such operation, although the engaging segment 49c of the downwardly extending temporary fixing claw 49b engages a peripheral edge of the lower temporary fixing aperture 27b, the downwardly extending temporary fixing claw 49b is resiliently deformed toward a center of the lower temporary fixing aperture 27b in a warped shape, permitting the engaging segment 49c to pass through the lower temporary fixing aperture 27b.

Upon pass of the engaging segment 49c through the lower temporary fixing aperture 27b, the downwardly extending temporary fixing claw 49b restores to its original position prior to the resilient deformation, allowing the engaging segment 49c to engage the peripheral edge of the lower temporary fixing aperture 27b as shown in FIG. 11A. This enables the left pad section 43 of the shock absorbing pad 40 to be temporally fixed to the instrument panel 11.

The temporary fixing claws 47, 49a formed in the shock absorbing pad 40 show in FIG. 3 are identical in structure as the temporary fixing claw 49b and therefore a description of the temporary fixing claws 47, 49a is herein omitted.

As set forth above, the shock absorbing pad 40 has the temporary fixing claws 47, 49a, 49b, 52, 57 and the coupling protrusions 46a, 46b, 48a, 48b, 54a, 54b, 55a, 55b, all of which protrude from the shock absorbing pad 40. Compelling the temporary fixing claws 47, 49a, 49b, 52, 57 to engage the temporary fixing apertures 25, 27a, 27b, 28, 30 causes the shock absorbing pad 40 to be temporarily fixed to the instrument panel 11. Thus, the shock absorbing pad 40 is simply and temporarily fixed to the instrument panel 11.

Concurrently with such temporary fixing, the coupling protrusions 46a, 46b, 48a, 48b, 54a, 54b, 55a, 55b protrude at the rear side of the instrument panel 11 via the through-apertures 24a, 24b, 26a, 26b, 29a, 29b, 32a, 32b, 33. Consequently, the distal ends of the coupling protrusions 46a, 46b, 48a, 48b, 54a, 54b, 55a, 55b can be easily coupled to the air conditioning duct 70.

Figure 12:
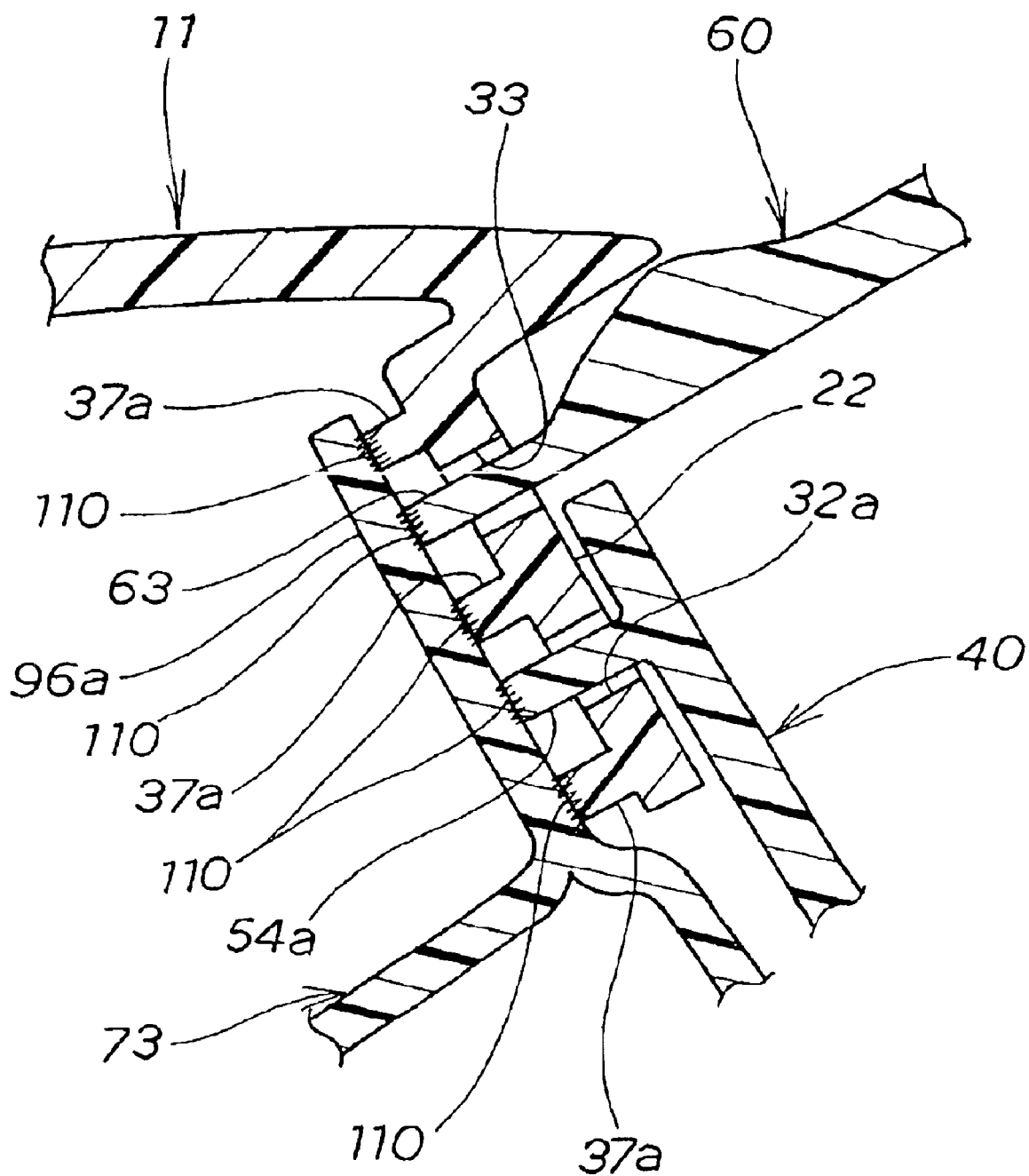
FIG. 12 is an enlarged view of a section 12 of FIG. 9A.

FIG. 12 shows a condition wherein the shock absorbing pad 40, the accommodation case 60 and the instrument panel 11 are coupled to the right air conditioning duct component 73.

Allowing the upper central coupling flap 96a of the right air conditioning duct component 73 to be brought into abutting engagement with the associated distal ends of the upper coupling protrusion 54a of the shock absorbing pad 40, the coupling protrusion 63 of the accommodation case 60 and the plural upper convex segments 37a formed on the case receiving section 22 of the instrument panel 11 to conduct welding by vibrating the abutted portions allows formation of vibration weld portions 110.

Coupling the instrument panel 11, the shock absorbing pad 40 and the accommodation case 60 to the air conditioning duct 70 by vibration welding enables mounting fixtures, such as rivets or screws, to be dispensed with, resulting in a decrease in the number of component parts. For this reason, the shock absorbing pad 40 and the air conditioning duct 70 can be concurrently mounted to the instrument panel 11, with a resultant reduction in labor required for assembling work.

Further, coupling the instrument panel 11 and the shock absorbing pad 40 to the air conditioning duct 70 by vibration welding allows metallic parts such as, for example, rivets or screws to be dispensed with, thereby providing an ease of recycle.

Coupling the upper coupling protrusion 54a of the shock absorbing pad 40 to the upper central flap 96a of the right air conditioning duct component 73 by vibration welding enables the instrument panel 11 to be caught between the shock absorbing pad 40 and the upper central flap 96a of the right air conditioning duct component 73.

Coupling the upper central flap 96a of the right air conditioning duct component 73 to the upper convex segments 37a of the instrument panel 11 by vibration welding enables the shock absorbing pad 40, the right air conditioning duct component 73 and the instrument panel 11 to be firmly fixed with respect to one another.

While the right air conditioning duct component 73 has been described with reference to FIG. 12, the central air conditioning duct component 71 and the left air conditioning duct component 72 have the same principle.

Figure 13:
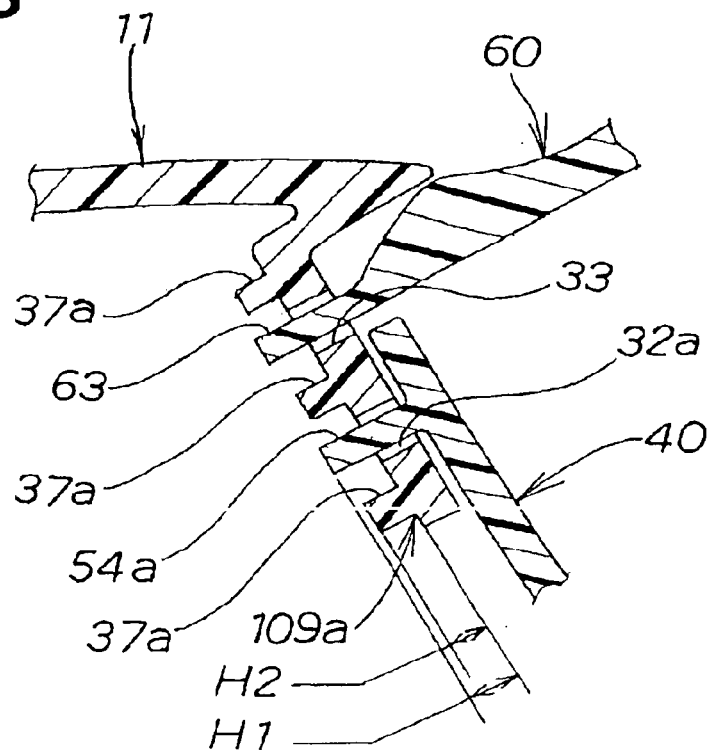
FIGS. 13 and 14 are cross sectional views illustrating the amounts of protrusions of a plurality of convex segments formed on the instrument panel, and coupling protrusions of the shock absorbing pad and the accommodation case.
Figure 14:
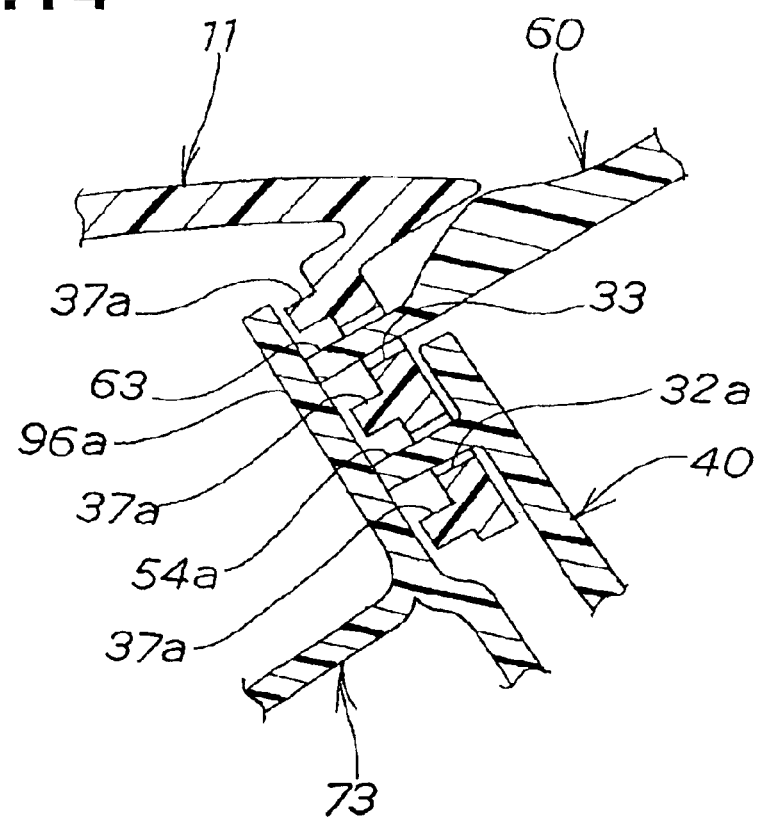

FIGS. 13 and 14 show the relationship between the upper convex segments 37a of the instrument panel 11, the upper coupling protrusion 54a of the shock absorbing pad 40 and the coupling protrusion 63 of the accommodation case 60.

In FIG. 13, suppose that the amount of protrusion wherein the upper coupling protrusion 54a protrudes from the upper rest area 109a of the instrument panel 11, under a condition in which the upper coupling protrusion 54a of the shock absorbing pad 40 is inserted through the upper through-aperture 32a, is H1. Suppose that the amount of protrusion wherein the upper convex segment 37a protrudes from the upper rest area 109a is H2. Here, it is determined that the relationship between the amount H1 of protrusion of the upper coupling protrusion 54a and the amount H2 of protrusion of the upper convex segment 37a is expressed as H1>H2. That is, the coupling structure of the mounting component parts of the instrument panel is arranged such that the upper coupling protrusion (coupling protrusion) 54a protrudes in a larger extent than the upper convex segment (convex segment) 37a before vibration welding is conducted under a condition wherein the upper coupling protrusion 54a of the shock absorbing pad 40 is inserted through the upper through-aperture 32a.

Also, suppose that the amount of protrusion of the coupling protrusion 63 protruding from the upper rest area 109a of the instrument panel 11 is H1.

In FIG. 14, the upper central coupling flag 96a of the right air conditioning duct component 73 is brought into abutting engagement with respective distal ends of the upper coupling protrusion 54a of the shock absorbing pad 40 and the coupling protrusion 63 of the accommodation case 60. Under this circumstance, when conducting welding by vibrating the abutted portions, permitting the distal end of the upper coupling protrusion 54a and the distal end of the coupling protrusion 63 causes the amount H1 of protrusion of the upper coupling protrusion and the amount H1 of protrusion of the coupling protrusion to be reduced. As a result, the central coupling flap 96a of the right air conditioning duct component 73 is brought into abutting engagement with the distal end of the upper convex segments 37a of the instrument panel 11, thereby enabling the upper convex segments 37a to be vibration welded to the upper central coupling flap 96a.

Thus, the upper central coupling flap 96a of the right air conditioning duct component 73 can be vibration welded to the respective distal ends of the upper coupling protrusion 54a, the coupling protrusion 63 and the upper convex segments 37a as shown in FIG. 12.

Here, the presence of the upper coupling protrusion 54a whose amount of protrusion is preset to be larger than those of the upper convex segments 37a enables the upper central coupling protrusion 96a of the right air conditioning duct component 73 to be reliably vibration welded to the upper coupling protrusion 54a of the shock absorbing pad 40.

Coupling the upper coupling protrusion 54a of the shock absorbing pad 40 and the upper central coupling protrusion flap 96a of the right air conditioning duct component 73 by vibration welding enables the shock absorbing pad 40 and the right air conditioning duct component 73 to be amounted with respect to one another under a condition wherein the instrument panel 11 is caught between these components.

Thus, by selecting a condition where H1>H2, even if the upper coupling protrusion 54a and the upper convex segments 37a are fabricated in dimensions with relatively rough precisions, it is possible for the instrument panel 11, the shock absorbing pad 40 and the right air conditioning duct component 73 to be mounted with respect to one another. As a result, it becomes simple for the instrument panel 11 and the shock absorbing pad 40 to be manufactured.

The present invention is not limited to a particular relationship, as shown in the preferred embodiment of FIG. 13, wherein the amount H1 of protrusion, in which the upper coupling protrusion 54a protrudes from the upper rest area 109a of the instrument panel 11, is correlated with the amount H2 of protrusion, in which the upper convex segments 37a of the instrument panel 11 protrudes from the upper rest area 109a, in the relationship of H1>H2. According to the present invention, it may be also possible for the relationship H1=H2 to be determined. In such a case, however, in consideration of occurrence where the relationship H1<H2 exists due to fabricating tolerance, it is needed for the upper coupling protrusion 54a and the upper convex segments 37a to have an increased precision. Even when, for example, H1<H2, the upper convex segments 37a melts during vibration welding and the amount of protrusion becomes smaller value than the amount H2 of protrusion. For this reason, it is possible for the upper coupling protrusion 54a to be vibration welded to the upper central coupling flap 96a together with the upper convex segments 37a.

Now, a coupling structure of an instrument panel of a second preferred embodiment is described below with reference to FIG. 15.

The coupling structure for mounting component parts of the instrument panel is comprised of an instrument panel 121 located in a front area of a passenger compartment of a vehicle which is not shown, a shock absorbing pad (a surface-mounted member) 130 mounted to a front surface (a surface facing the passenger compartment) of the instrument panel 121, and an air conditioning duct (a rear surface-mounted member) 135 mounted to a rear surface (a surface facing an engine room) of the instrument panel 121 link in the first embodiment. A reference numeral 138 designates a lid mounted to the instrument panel 121 in an opening and closing relationship.

An upper rest area 122a (a rear surface of the instrument panel) of the instrument panel 121 is formed with upper convex segments 124a, 124a at upper and lower positions in the vicinity of an upper through-aperture 123a, respectively. Likewise, a lower rest area 122b (the rear surface of the instrument panel) of the instrument panel 121 is formed with lower convex segments 124b, 124b at upper and lower positions in the vicinity of a lower through-aperture 123b, respectively. The instrument panel 121 has its lower end formed with a temporary fixing recessed portion 125. The temporary fixing recessed portion 125 has an engagement aperture 125a.

The shock absorbing pad 130 has upper and lower ends formed with upper and lower coupling protrusions 131a, 131b. The shock absorbing pad 130 has at its lower end an engaging claw 132, which has an engaging segment 132a.

In order to couple mounting component parts to the instrument panel 121, firstly, the upper and lower coupling protrusions 131a, 131b of the shock absorbing pad 130 are inserted to the upper and lower through-apertures 123a, 123b of the instrument panel. Subsequently, the engaging claw 132 of the shock absorbing pad 130 is inserted to the temporary fixing recessed portion 125 of the instrument panel 121 to cause the engaging segment 132a of the engaging claw 132 of the shock absorbing pad 130 to be brought into engagement with the engagement aperture 125a. As such, the shock absorbing pad 130 is temporarily fixed to the instrument panel 121.

Then, the upper and lower coupling flaps 136a, 136b of the air conditioning duct 135 are brought into abutting engagement with the respective distal ends of the upper and lower coupling protrusions 131a, 131b and the upper and lower convex segments 124a, 124b. Under this condition, welding is conducted by vibrating the abutted portions enables the shock absorbing pad 130 and the air conditioning duct 135 to be mounted to the instrument panel 121.

Although the above preferred embodiments have been described above in conjunction with the examples wherein the instrument panel, the shock absorbing pad and the air conditioning duct are coupled to one another by vibration welding, a modification may be made such that the respective members are coupled to one another by other heat welding techniques.

Although the above preferred embodiments have been described with reference to the examples wherein the instrument panel, the accommodation case and the air conditioning duct are made of olefin thermoplastic resin, these component parts may be made of other type of thermoplastic resin. However, the use of olefin thermoplastic resin is advantageous in providing an ease of recycle.

Further, although the preferred embodiments have been described with reference to the examples wherein the surface-mounted members such as the shock absorbing pad and the accommodation case are assembled to the front surface of the instrument panel and wherein the rear surface-mounted member such as the air conditioning duct is mounted to the rear surface of the instrument panel, it is to be noted that the surface-mounted member and the rear surface-mounted member are not limited to those members.

In addition, the above preferred embodiments have been described with reference to the example wherein the shock absorbing pad is formed with the coupling protrusion which is adapted to be coupled to the flap of the air conditioning duct, the present invention is not limited to this example and it may be possible for the flap of the air conditioning duct to be formed with the coupling protrusion which can be coupled to the shock absorbing pad. Furthermore, a layout for the coupling protrusions or the temporary fixing claws can be suitably determined according to the shapes of the instrument panel, the shock absorbing pad or the air conditioning duct.

Although the preferred embodiments have been discussed with reference to the examples wherein the rear surface of the instrument panel is formed with the plurality of convex segments whose distal ends are vibration deposited to the flap of the air conditioning duct, the present invention is not limited thereto and it may be modified such that the rear surface of the instrument panel does not have the convex segments. In such a case, catching the instrument panel between the shock absorbing pad and the air conditioning duct may cause the shock absorbing pad, the air conditioning duct and the instrument panel to be coupled with respect to one another.

Industrial Applicability

The present invention features the formation of the plurality of through-apertures through which the instrument panel is caught between and coupled to the surface-mounted member and the rear surface-mounted member, providing an ease of assembling work of such component parts for thereby providing utility in assembling steps of the automobile.

What is claimed is:

1. An assembly of an instrument panel and component parts, comprising:

an instrument panel (11) having a plurality of through-apertures (24a, 24b, 25, 26a, 26b, 27a, 27b, 28, 29a, 29b, 30, 32a, 32b, 33, 123a, 123b);

at least one surface-mounted member (40, 60) located on a front surface of said instrument panel; and at least one rear surface-mounted member (71, 72, 73) located on a rear surface of said instrument panel, wherein said rear surface-mounted member has a plurality of coupling flaps (77, 78, 86a, 86b, 96a, 96b) projecting outwardly therefrom, and said instrument panel, said surface-mounted member and said coupling flaps of said rear surface-mounted member are coupled together by vibration welding via said through-apertures.

2. The assembly according to claim 1, wherein said surface-mounted member (40, 60) includes a plurality of temporary fixing claws (47, 49a, 49b, 52, 57) and a plurality of coupling protrusions (46a, 46b, 48a, 48b, 54a, 54b, 55a, 55b, 131a, 131b), said surface-mounted member is temporarily fixed to said instrument panel (11) by allowing said temporary fixing claws to engage said through-apertures, and said coupling protrusions protrude through said instrument panel toward the rear surface of said instrument panel via said through-apertures to cause distal ends of said coupling protrusions to be coupled with said coupling flaps of rear said surface-mounted member (71, 72, 73).

3. The assembly according to claim 2, wherein said instrument panel (11) is provided on the rear surface with a plurality of convex segments (35a, 35b, 36a, 36b, 37a, 37b, 124a, 124b) and, when coupling the distal ends of said coupling protrusions and said convex segments with said coupling flaps of said rear surface-mounted member by vibration welding, the amount of protrusion of said coupling protrusions prior to the vibration welding is larger than the amount of protrusion of said convex segments prior to the vibration welding.

* * * * *

UNITED STATES PATENT AND TRADEMARK OFFICE
CERTIFICATE OF CORRECTION

PATENT NO. : 6,767,041 B2
DATED : July 27, 2004
INVENTOR(S) : Shiono

It is certified that error appears in the above-identified patent and that said Letters Patent is hereby corrected as shown below:

Title page,
Item [73], Assignee, after "Kabushiki" insert -- Kaisha --.
Item [56], References Cited, U.S. PATENT DOCUMENTS, insert
-- 2001/0030070    10/2001    Teranishi et al.
   6,502,888 B2    01/2003    Inoue et al.
   6,095,272 A    08/2000    Takiguchi et al.
   5,364,159 A    11/1994    Keiman et al. --.

Column 16,
Line 18, delete "rear said" and insert -- said rear --.

Signed and Sealed this

Eighteenth Day of January, 2005

JON W. DUDAS
*Director of the United States Patent and Trademark Office*